Figures 1, 2:
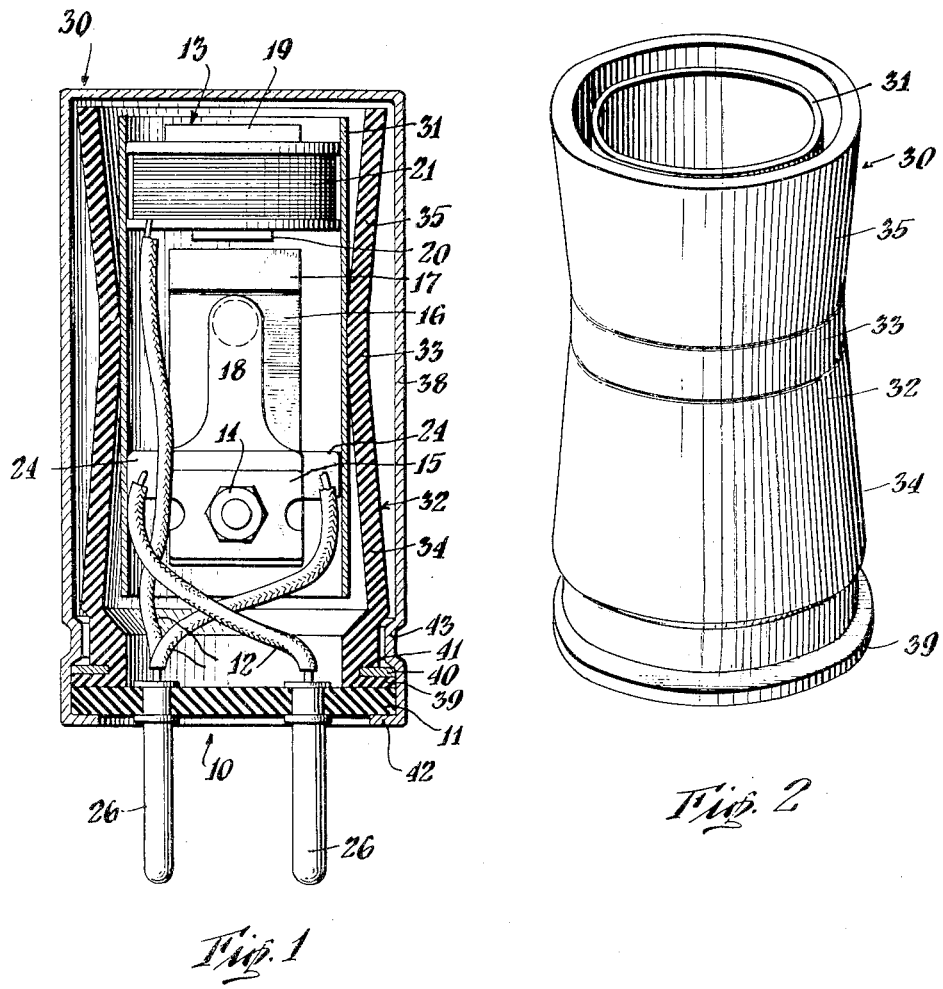

July 4, 1950     C. HUETTEN ET AL     2,513,940

VIBRATOR SUPPORT

Filed Jan. 13, 1948

INVENTORS
*Clarence Huetten*
BY *Sheldon John Raiter*

ATTORNEY

Patented July 4, 1950

2,513,940

UNITED STATES PATENT OFFICE 2,513,940

VIBRATOR SUPPORT

Clarence Huetten and Sheldon John Raiter, Indianapolis, Ind., assignors to P. R. Mallory & Co., Inc., Indianapolis, Ind., a corporation of Delaware Application January 13, 1948, Serial No. 2,106

14 Claims. (Cl. 200—168)

This invention relates to a vibrator support and to a vibrator assembly utilizing such a support.

Heretofore, cantilever suspensions have ordinarily been utilized to secure vibrator units to the pronged bases by which they are plugged in to power supplies or other apparatus, suitable sponge rubber members being utilized to prevent excessive transmission of shake or vibration from the vibrating mechanism to other parts of the apparatus. The assembly, including the vibratory mechanism, the base, and the sponge rubber members, was ordinarily enclosed by a metal can secured, in any suitable manner, to the base.

Such cantilever suspensions have resulted in disadvantages and defects in the vibratory mechanism in that the vibrator was not centrally located, resulting in unbalanced forces being set up in the vibrating mechanism causing a high level of transmitted vibration with a resulting excessive noise level. The sponge rubber members in vibrators of this type were deflected by the vibrations with a tensile or compressive stress rather than a shearing stress, which further increases the transmitted shake, as the compliance of sponge rubber decreases more rapidly with deflection when subjected to a compressive or tensile stress than when subjected to a shearing stress. Moreover, such sponge rubber members were usually in direct contact with a metal part or parts of the vibrator. This also resulted in greater vibration transmission since, after prolonged exposure to the heat developed by the metal parts, the sponge rubber became crisp with resultant loss of compliance.

Difficulties were also encountered in assembling the vibrator since the leads connecting the base prongs and vibrator terminals were connected after the vibrator was assembled and it was necessary, after assembly, to thread the leads through slots formed in the sponge rubber member, as well as to adjust contact spacing.

In accordance with our invention, these difficulties and shortcomings are eliminated or greatly minimized by providing a tube member for frictionally receiving the vibrator and mounting this tube within a resilient socket which preferably is secured or molded to the tube at an intermediate portion thereof and has a flared or frustro-conical end portion which is suitably anchored to the base of the vibrator, preferably by means of a metal can in which the assembly is housed. The socket may desirably include a second upwardly-extending flared or frustro-conical portion, the end of which is closely spaced to the top portion of the can.

In this fashion the vibrator assembly is held in "floating" position within the can whereby the vibrations of the assembly are effectively isolated. This substantially reduces the transmitted vibration and the accompanying noise resulting therefrom, the flared portions of the socket being particularly effective in this connection when the vibrator is in a horizontal position. The tube mounting insures that the vibrator is centrally located although the plane of the reed is not predetermined and any angular orientation is possible. Our novel support also prevents the metal of the vibrator from touching the sponge rubber socket at any point and all space within the metal can is efficiently utilized. The vibrator may be very readily assembled in that the leads interconnecting the plug and vibrator terminals may be connected and all adjusting operations performed before the vibrator unit is inserted into the tube and then the metal can may be placed in position upon the base to complete the assembly.

Accordingly, it is an object of the invention to improve the construction and operation of vibrator supports and of vibrator assemblies utilizing such supports.

It is a further object of the invention to provide a vibrator assembly in which the vibration or shake transmitted from the vibrating reed to other parts of the apparatus is reduced to a minimum.

It is a still further object of the invention to provide a vibrator assembly in which the vibrator may be completely adjusted before assembly and in which the work and time consumed in assembly are reduced to a minimum.

It is a still further object of the invention to provide a vibrator support and assembly which is of low cost, of long life, economical to build and assemble, and in which all space is efficiently utilized.

Various other objects, advantages, and features of the invention will become apparent from the following detailed description taken in conjunction with the accompanying drawings, in which:

Figure 1 is a sectional view, partly in elevation, of a vibrator assembly utilizing the novel support; and Figure 2 is a perspective view of the support including the tube and a resilient socket secured thereto.

Referring now to the drawings in detail, the assembly comprises a unit 10 consisting of a base 11, leads 12, and a vibrator 13. The vibrator, in itself, forms no part of this invention and any suitable type of vibrator may be used. For purposes of illustration, the vibrator may comprise a stack screw 14 on which is assembled a stack 15 carrying a reed 16 having an armature 17. The stack also supports contact-carrying side springs, one of which is shown at 18. A hook shaped frame 19 is secured to the stack 15 and this frame carries a pole piece 20 upon which is mounted a driver coil 21 for maintaining the reed in continuous vibration in a manner well known to those skilled in the art.

Protruding from the stack 15 are a plurality of terminals 24 for making electrical connections to the reed and side springs, these terminals being connected by the leads 12 to prongs 26 which are carried by the base 11. It will be understood that the leads 12 may be connected to terminals 24 and prongs 26 before the vibrator unit is assembled into the support, in the manner hereinafter described. Further, before assembly, any necessary adjustments may be made to the vibrator, such as the spacing between the side spring contacts and the reed, which leads to a substantial increase in the speed of assembly. Hitherto, vibrators were completely assembled before any adjusting operations were performed.

The novel vibrator support comprises a unit 30 consisting of a tube 31 and a resilient socket 32 secured to said tube. Preferably and advantageously, the tube 31 is formed of cardboard and the vibrator 13 is retained therein by friction with the top of the frame 19 substantially flush with the top of the tube. The necessary friction is provided by engagement of the driver coil 21 with the top of the tube and by engagement of the terminals 24 with the lower portion of the tube. Although this frictional engagement is sufficient to retain the vibrator in position within the tube, other methods of securing the vibrator within the tube are not excluded from the spirit and scope of the invention. Further, although the tube is preferably of circular cross section, it may be desirable in some applications that the tube be of square, oblong, or other cross section. The word "tube" in the appended claims is intended to include such varied cross sections.

The resilient socket 32 is preferably formed of sponge rubber and has a constricted portion 33 circumferentially engaging and preferably molded to the outer surface of the tube 31 at a region intermediate the ends thereof. This constricted portion merges into a depending flared or frustro-conical skirt portion 34 which is provided with means at its lower end enabling it to be secured to the base 11. The socket structure thus far described is capable of use as a vibrator support and enables many advantages of the invention to be attained. However, preferably and advantageously, the socket includes an upper flared or frustro-conical portion 35 which extends longitudinally from the region 33 toward the upper end of the tube, the upper end of the portion 35 extending slightly beyond said upper end of the tube.

A metal can 38 is provided for housing the socket 32, the tube 31 and the vibrator 13. This can cooperates with the lower end of the socket and the base 11 to hold the parts in assembled position. To this end, the lower end of the flared portion 34 is provided with a flange 39 which is adapted to rest upon the base 11. Overlying the flange 39 is a metal ring 40 which fits into a recess 41 formed at the lower end of the socket. The bottom of the can is spun over at 42 against the lower surface of the base 11 and an integral abutment 43 is formed in the can which engages the ring 40 and presses it against the base. In this manner, the socket-tube unit and the vibrator held thereby are maintained in assembled position.

It will be apparent that the vibrator unit including the base 11, leads 12, and vibrator 13 may be completely assembled and adjusted before the vibrator is fitted into the tube and the metal can assembled thereon. This is contrary to present practice and results in great savings of time and labor in the assembly operation.

The novel support arrangement also offers a number of important advantages. Thus, the socket 32 is so shaped and constructed as to touch the can and base only at the flanged portion 39. Accordingly, the vibrator assembly is held in "floating" position within the can and the vibrations thereof are effectively isolated, thereby substantially reducing the transmission of vibrations from the vibrator to the can, base 11, and other parts of the apparatus with which the vibrator is utilized. The flared portions 34, 35 are particularly effective in reducing transmission of vibrations or shake when the vibrator is in a horizontal position and the attachment of the socket to the intermediate portion 33 of the tube 31 results in a further reduction in vibration transmission. The frustro-conical shape of the socket portion 34 causes the socket to be deflected in shear, rather than in tension or compression, by the vibratory forces. Since the compliance characteristics of sponge rubber in shear are far superior to the characteristics in tension or compression, more uniform properties are obtained and the transmission of vibration is still further reduced.

The novel support also provides a definite central location for the vibrator although the plane of the reed is not predetermined and any desired angular orientation of the reed may be used. Further, the metal parts of the vibrator contact the tube 31, rather than the rubber socket thereby greatly minimizing crisping of the rubber with resultant loss in compliance. Finally, all the space within the can is efficiently utilized, thereby allowing the overall dimensions of the assembly to be substantially reduced.

Although the invention has been described in connection with a present, preferred embodiment thereof, this description is not intended to limit the invention, the scope of which is defined by the appended claims.

What is claimed as new and desired to be secured by Letters Patent is:

1. A vibrator assembly comprising, in combination, a support, a tube, a vibrator mounted in and gripped by said tube, and a resilient socket having a constricted portion secured to the outer surface of said tube at a circumferential region thereof intermediate the ends of said tube and another portion secured to said support, said socket engaging the tube only at said constricted portion.

2. A vibrator assembly comprising, in combination, a support, a tube, a vibrator mounted in said tube, a socket of resilient material having a generally frustro-conical portion, means for securing the enlarged end of said frustro-conical portion to said support, and means for securing the other end of said frustro-conical portion to the outer surface of said tube at a region intermediate the ends thereof.

3. A vibrator assembly comprising, in combination, a support, a tube, a vibrator frictionally mounted in said tube, a socket of resilient material having a portion thereof secured to an outer circumferential region of said tube at an intermediate section thereof and having an outwardly flared depending skirt portion, a can housing said socket, said tube, and said vibrator, and means for securing said can and said flared portion to said support.

4. A vibrator assembly comprising, in combination, a base, a tube, a vibrator frictionally mounted in said tube, a resilient socket molded to the outer surface of said tube at a region intermediate the ends thereof, said socket having frustro-conical end portions extending longitudinally outwardly from said intermediate region, a can housing said socket and engaging only one extreme end portion of said socket whereby the vibrator is held in floating position within the can, and means for securing said can and one end of said socket to said base.

5. A vibrator assembly comprising, in combination, a base having connection prongs secured thereto, a tube, a vibrator frictionally mounted in said tube, a socket of resilient sponge material secured to the outer surface of said tube at a region intermediate the ends thereof, said socket having outwardly flared end portions extending from said intermediate region to the respective ends of said tube, a metal can housing said socket, said tube, and said vibrator, means for securing said can and one end of said socket to said base, and leads interconnecting said prongs and the terminals of said vibrator.

6. A vibrator assembly comprising, in combination, a base having connection prongs secured thereto, a tube, a vibrator frictionally mounted in said tube, a socket of resilient sponge material secured to the outer surface of said tube at a region intermediate the ends thereof, said socket having outwardly flared end portions extending from said intermediate region to the respective ends of the tube, one of said end portions having a flange formed thereon for engaging said base, a metal ring overlying said flange, a can having its lower end spun over into engagement with the lower peripheral surface of said base and having an interior abutment engaging said ring to hold the socket in assembled position upon said base, and leads interconnecting said prongs and the terminals of said vibrator.

7. A vibrator assembly comprising, in combination, a unit including a base having connection prongs secured thereto, a vibrator, and leads interconnecting said prongs and the terminals of said vibrator, a second unit including a tube, and a resilient socket secured to a limited circumferential region of said tube intermediate the ends thereof, said socket having an outwardly flared depending skirt portion, a metal can adapted for holding engagement with said base and for housing said socket, and means for holding said units and said can in assembled relation, said vibrator being insertable into said tube and frictionally engageable with the walls of said tube, whereby the connections between the vibrator and the prongs on the base may be made before the vibrator unit is inserted into the tube assembly and the can.

8. A vibrator assembly comprising, in combination, a unit including a base having connection prongs secured thereto, a vibrator, and leads interconnecting said prongs and the terminals of said vibrator, a second unit including a tube, and a resilient socket secured to a circumferential region of said tube intermediate the ends thereof, said socket having flared end portions extending from said circumferential region to the respective ends of the tube, a can for housing said socket and engageable with said socket only at one extreme end portion thereof whereby the tube is held in floating position within the can, and means for securing said can and one end of said socket to said base, said vibrator being insertable into said tube and frictionally engageable with the walls thereof whereby the connections between the vibrator and the prongs on the base may be made before the vibrator unit is inserted into the tube assembly and the can.

9. A vibrator assembly comprising, in combination, a unit including a base having connection prongs secured thereto, a vibrator, and leads interconnecting said prongs and the terminals of said vibrator, a second unit including a tube, and a resilient socket secured to a circumferential region of said tube, said socket having flared end portions extending from said circumferential region to the respective ends of the tube, one of said end portions having a flange formed thereon, a can for housing said socket and engageable with said socket only at one extreme end portion thereof whereby the tube is held in floating position within the can, said can having its lower end adapted to be spun over into engagement with said base, a metal ring overlying said flange, and an integral abutment formed in said can for engagement with said ring to hold the socket-tube assembly upon the base, said vibrator being insertable into said tube and frictionally engageable with the walls thereof whereby the connections between the vibrator and the prongs on the base may be made before the vibrator unit is inserted into the tube assembly and the can.

10. A support for a vibrator comprising, in combination, a tube adapted for frictionally receiving a vibrator, and a socket of resilient material secured to a limited circumferential region of said tube intermediate the ends thereof, said socket having a flared depending skirt portion adapted for attachment to a base of suitable form.

11. A support for a vibrator comprising, in combination, a tube adapted for frictionally receiving a vibrator, and a resilient socket having a frustro-conical portion with its smaller end secured to the outer surface of said tube at a region intermediate its ends and with its enlarged end positioned adjacent one end of said tube.

12. A support for a vibrator comprising, in combination, a tube adapted for frictionally receiving a vibrator, a resilient socket having a frustro-conical portion with its smaller end secured to the outer surface of said tube at a region intermediate its ends and with its enlarged end positioned adjacent one end of said tube, and a flange formed on said enlarged end for attaching the socket to a base of suitable form.

13. A support for a vibrator comprising, in combination, a tube adapted for frictionally receiving a vibrator, and a socket of resilient material secured to the outer surface of the tube intermediate the ends thereof, said socket having flared end portions extending from said intermediate surface of the tube toward the respective ends thereof.

14. A support for a vibrator comprising, in combination, a tube adapted for frictionally receiving a vibrator, a socket of resilient sponge material molded to a circumferential region of said tube intermediate the ends thereof, said socket having frustro-conical end portions extending from said circumferential region toward the respective ends of the tube, and a flange formed at one end of the socket for attaching it to a base of suitable form.

CLARENCE HUETTEN.
SHELDON JOHN RAITER.

REFERENCES CITED

The following references are of record in the file of this patent:

UNITED STATES PATENTS

| Number | Name | Date |
|---|---|---|
| 2,190,685 | Slater | Feb. 20, 1940 |
| 2,197,607 | Brown | Apr. 16, 1940 |
| 2,313,379 | Wood | Mar. 9, 1943 |
| 2,339,973 | Aust | Jan. 25, 1944 |
| 2,443,037 | Huetten | June 8, 1948 |